(12) United States Patent
Nakaji et al.

(10) Patent No.: US 10,511,036 B2
(45) Date of Patent: Dec. 17, 2019

(54) FUEL CELL MODULE WITH ARRANGED RIDGE SEGMENTS

(71) Applicants: TOYOTA JIDOSHA KABUSHIKI KAISHA, Toyota-shi, Aichi-ken (JP); TOYOTA SHATAI KABUSHIKI KAISHA, Kariya-shi, Aichi-ken (JP)

(72) Inventors: Hiroya Nakaji, Toyota (JP); Kazunori Shibata, Mishima (JP); Hiroki Okabe, Okazaki (JP); Kousuke Kawajiri, Okazaki (JP); Satoshi Futami, Toyota (JP); Keiji Hashimoto, Nagakute (JP); Takamasa Kanie, Toukai (JP)

(73) Assignees: TOYOTA JIDOSHA KABUSHIKI KAISHA, Toyota-shi, Aichi-ken (JP); TOYOTA SHATAI KABUSHIKI KAISHA, Kariya-shi, Aichi-ken (JP)

( * ) Notice: Subject to any disclaimer, the term of this patent is extended or adjusted under 35 U.S.C. 154(b) by 73 days.

(21) Appl. No.: 15/592,579

(22) Filed: May 11, 2017

(65) Prior Publication Data

US 2017/0331123 A1      Nov. 16, 2017

(30) Foreign Application Priority Data

May 13, 2016   (JP) .................... 2016-097306

(51) Int. Cl.
*H01M 8/04119*   (2016.01)
*H01M 8/04291*   (2016.01)
(Continued)

(52) U.S. Cl.
CPC ... *H01M 8/04156* (2013.01); *H01M 8/04291* (2013.01); *H01M 8/1004* (2013.01); *H01M 8/04089* (2013.01)

(58) Field of Classification Search
CPC ........... H01M 8/04156; H01M 8/0258; H01M 8/04291; H01M 8/1004; H01M 8/04089
See application file for complete search history.

(56) References Cited

U.S. PATENT DOCUMENTS 7,056,608 B2 *   6/2006   Lloyd ................. H01M 8/0247
429/480
2011/0244369 A1   10/2011   Kondo
(Continued)

FOREIGN PATENT DOCUMENTS

JP      2010-251020 A      11/2010
JP      2014-167860 A      9/2014
WO   WO 2014/132707      *   9/2014   ............. H01M 8/10

*Primary Examiner* — Edu E. Enin-Okut
*Assistant Examiner* — Kwang Han
(74) *Attorney, Agent, or Firm* — Dickinson Wright, PLLC

(57) ABSTRACT

A channel forming body used in a fuel cell module has a gas channel, a water conduit, and a communication path that provides communication between the gas channel and the water conduit. When a ridge is seen in a cross-section perpendicular to a channel extension direction, one of both ends of an external shape of the ridge is shaped so as to be located closer to a center of the ridge than an imaginary surface of the channel assumed to extend in a straight line along the channel extension direction. Portions of the ridge located closer to the center of the ridge are formed opposite from each other at left and right ends of the external shape of the ridge with the communication path interposed therebetween.

5 Claims, 9 Drawing Sheets

(51) Int. Cl.
*H01M 8/1004* (2016.01)
*H01M 8/04089* (2016.01)

(56) References Cited

U.S. PATENT DOCUMENTS

| | | | | |
|---|---|---|---|---|
| 2011/0300465 A1* | 12/2011 | Ohta | ................... | H01M 8/0206 |
| | | | | 429/457 |
| 2015/0221958 A1* | 8/2015 | Hashimoto | ......... | H01M 8/0254 |
| | | | | 429/457 |
| 2016/0380277 A1* | 12/2016 | Okabe | ................. | H01M 8/0258 |
| | | | | 429/434 |

* cited by examiner

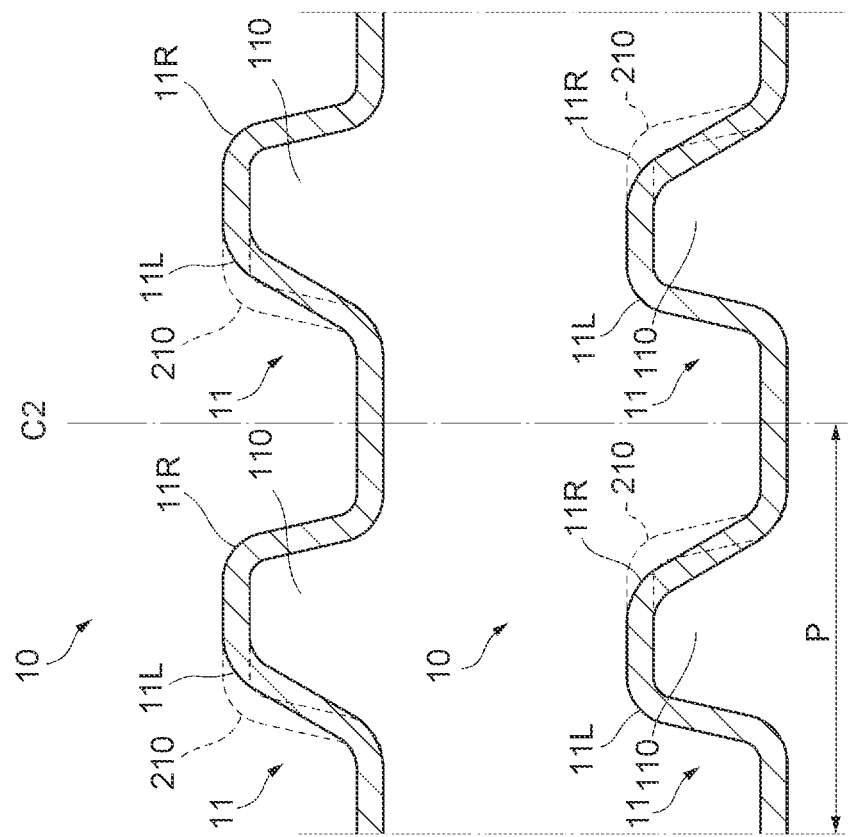

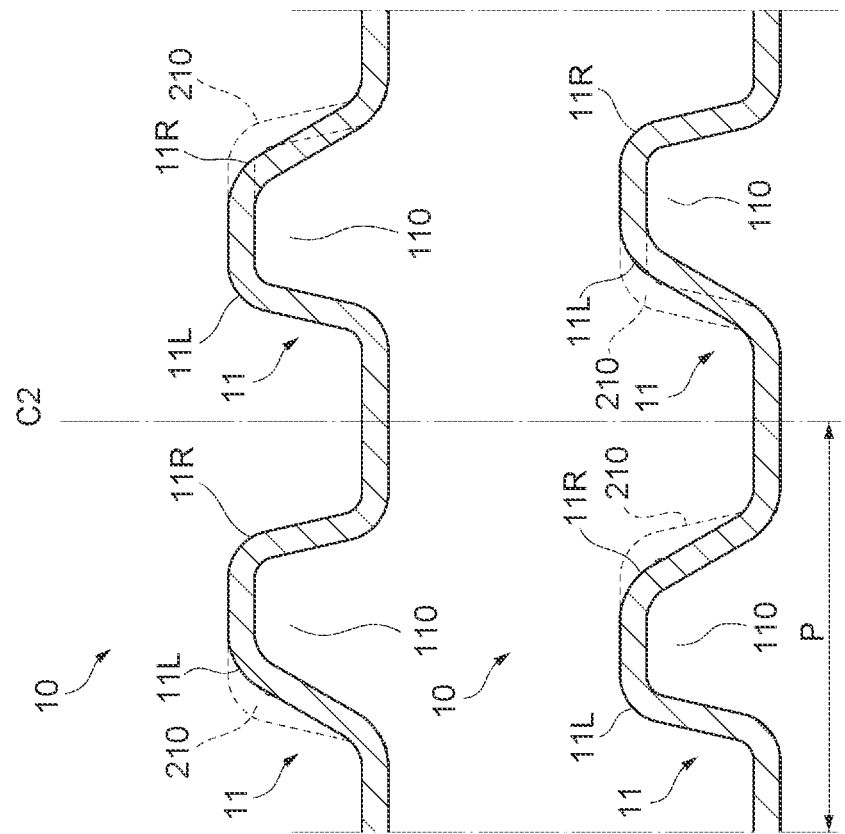

FUEL CELL MODULE WITH ARRANGED RIDGE SEGMENTS

INCORPORATION BY REFERENCE

The disclosure of Japanese Patent Application No. 2016-097306 filed on May 13, 2016 including the specification, drawings and abstract is incorporated herein by reference in its entirety.

BACKGROUND

1. Technical Field

The present disclosure relates to a fuel cell module.

2. Description of Related Art

In the fuel cell described in Japanese Patent Application Publication No. 2014-167860, an electrode catalyst layer is provided on each side of a solid polymer electrolyte membrane and a gas diffusion layer is provided on the outside of each electrode catalyst layer to form a membrane electrode assembly. A channel forming body is disposed between this membrane electrode assembly and a separator.

On the side of the channel forming body facing the membrane electrode assembly, a plurality of groove-like gas channels extending in a straight line are arrayed, and on the side of the channel forming body facing the separator (the side opposite from the side where the gas channels are formed), a plurality of water conduits extending in a straight line are arrayed opposite from the gas channels across a partition wall. The gas channel is a channel through which a reactant gas is supplied to the fuel cell, and the water conduit is a channel through which water produced from the fuel cell is discharged. In addition, communication paths (slits) that provide communication between the gas channel and the water conduit are cut in the partition wall, so that water produced by an electrode reaction in the membrane electrode assembly is discharged from the gas channel to the water conduit through these communication paths.

SUMMARY

JP 2014-167860 A proposes a technique involving forming the communication paths that provide communication between the gas channel and the water conduit in the channel forming body so that produced water is smoothly discharged by flowing toward the separator (water conduit) through these communication paths. However, this technique gives no consideration to the shape of the channel forming body for allowing a gas flowing through the gas channel to be actively delivered to the electrode (membrane electrode assembly), and thus needs to be improved in terms of efficiently supplying a gas to the electrode.

The present disclosure provides a fuel cell module that can supply a gas to the electrode with higher efficiency.

An aspect of the present disclosure relates to a fuel cell module including a channel forming body disposed between a membrane electrode assembly and a separator. The channel forming body has: a gas channel which is provided between a plurality of ridges arrayed on the side of the channel forming body facing the membrane electrode assembly, and through which a gas is supplied to a fuel cell; a water conduit which is provided adjacent to the gas channel on the side of the channel forming body facing the separator, and through which water produced from the fuel cell is discharged; and a communication path that is formed in a partition wall forming each ridge and provides communication between the gas channel and the water conduit. When the ridge is seen in a cross-section perpendicular to a channel extension direction, one of both ends of the external shape of the ridge is shaped so as to be located closer to the center of the ridge than an imaginary surface of the channel assumed to extend in a straight line along the channel extension direction. When the ridge is seen in the channel extension direction, portions of the ridge located closer to the center of the ridge are formed opposite from each other at left and right ends of the external shape of the ridge with the communication path interposed therebetween.

According to this configuration, when the ridge is seen in the channel extension direction, portions of both ends of the external shape of the ridge shaped so as to be located closer to the center of the ridge than the imaginary surface are formed opposite from each other at the left and right ends of the external shape of the ridge with the communication path interposed therebetween. Thus, the flow of a gas flowing through the gas channel is disturbed at positions where the communication paths are formed in the ridge. This disturbance in the gas flow causes an increase in the amount of gas delivered toward the membrane electrode assembly that is part of the gas flowing through the gas channels formed on the side of the channel forming body facing the membrane electrode assembly. As a result, the gas can be supplied to the electrode with higher efficiency.

The dimension in the channel extension direction of a pair of ridge segments of which the respective portions located closer to the center of the ridge are formed opposite from each other at the left and right ends of the external shape of the ridge with the communication path interposed therebetween may be larger on an inlet side of the gas channel than on a center side of the gas channel in the channel extension direction.

The dimension in the channel extension direction of a pair of ridge segments of which the respective portions located closer to the center of the ridge are formed opposite from each other at the left and right ends of the external shape of the ridge with the communication path interposed therebetween may be smaller on an outlet side of the gas channel than on the center side of the gas channel.

When adjacent ones of the ridges are seen in a cross-section perpendicular to the channel extension direction, the portion of one ridge shaped so as to be located closer to the center of the ridge than the imaginary surface may be formed at the same end of both ends of the ridge as that of the other ridge.

When adjacent ones of the ridges are seen in a cross-section perpendicular to the channel extension direction, the portion of one ridge shaped so as to be located closer to the center of the ridge than the imaginary surface may be formed at an end of both ends of the ridge opposite from that of the other ridge.

According to the present disclosure, it is possible to provide a fuel cell module that can supply a gas to the electrode with higher efficiency.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3B is a view illustrating the channel forming body in which the adjacent ridges have the same shape;

FIG. 3C is a view illustrating the channel forming body in which the adjacent ridges have the same shape;

FIG. 4B is a view illustrating the channel forming body in which the adjacent ridges are line-symmetrical;

FIG. 4C is a view illustrating the channel forming body in which the adjacent ridges are line-symmetrical;

DETAILED DESCRIPTION OF EMBODIMENTS

An embodiment of the present disclosure will be described below with reference to the accompanying drawings. The following description of the preferred embodiment is merely illustrative and not intended to limit the present disclosure and the application or usage thereof.

Figure 1A:
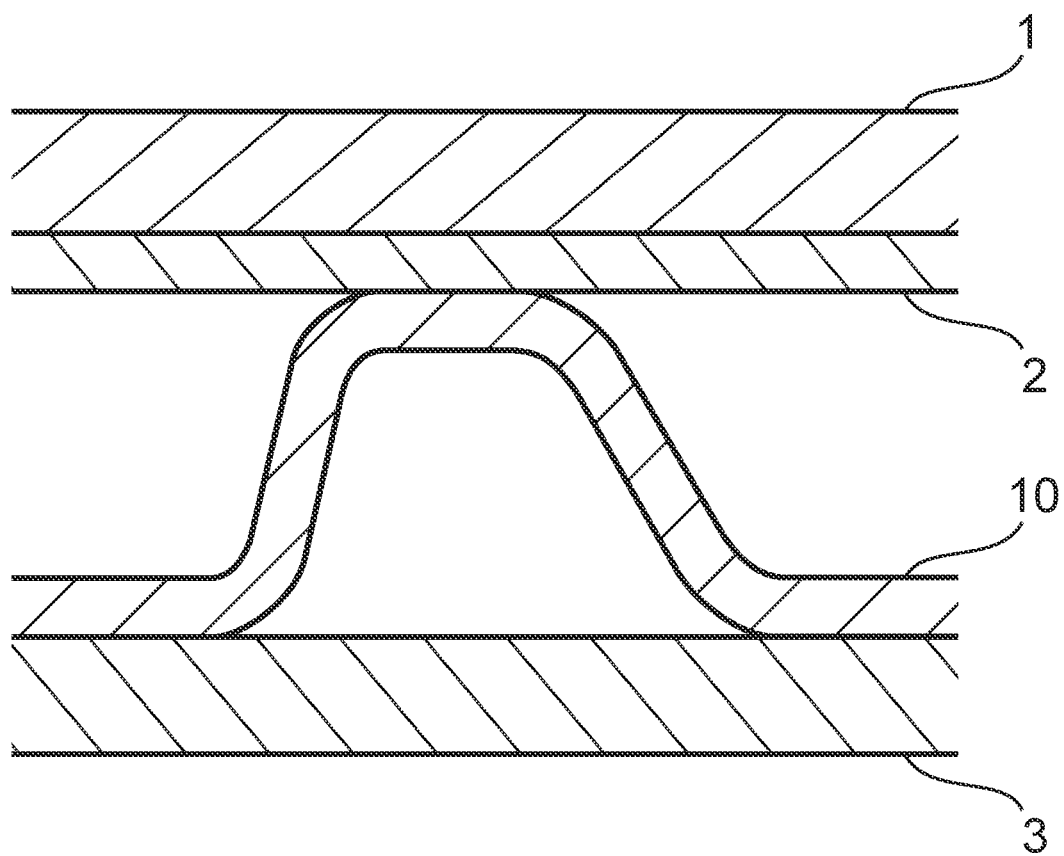
FIG. 1A is a schematic sectional view of a part (single cell) of a fuel cell module in an embodiment of the present disclosure.
Figure 1B:
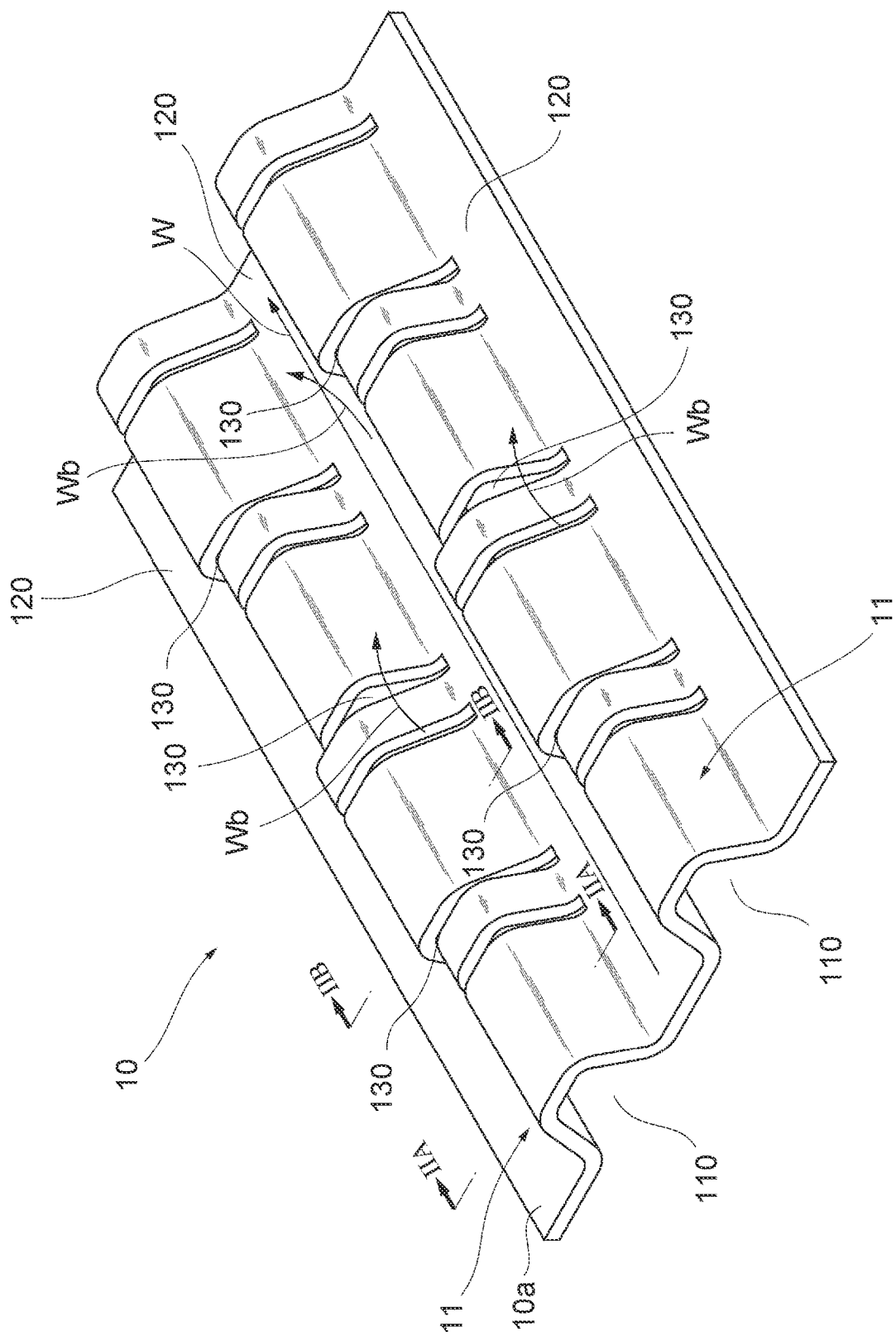
FIG. 1B is a schematic perspective view illustrating a configuration of a channel forming body of a fuel cell in the embodiment of the present disclosure.

First, a configuration of a channel forming body used in a fuel cell (fuel cell module) in this embodiment will be described. FIG. 1B is a schematic perspective view illustrating the configuration of the channel forming body. The channel forming body in this embodiment forms fluid passages through which a fuel gas (hydrogen) or an oxidant gas (oxygen, typically air) is supplied to an anode and a cathode.

The fuel cell in this embodiment of the present disclosure is formed by stacking a large number of single cells (not shown). As shown in FIG. 1A, each single cell includes: a membrane electrode assembly (MEA) 1 having a pair of electrodes (the anode and the cathode) disposed one on each side of an electrolyte membrane formed by an ion-exchange membrane; a gas diffusion layer 2 provided on each of the anode and the cathode; a channel forming body 10 (FIG. 1B etc.) disposed on the outside of the gas diffusion layer 2; and a separator 3 disposed on the outside of the channel forming body 10. The pair of electrodes is made of, for example, a porous carbon material supporting a catalyst, such as platinum, attached to surfaces of the electrodes. One electrode (anode) is supplied with a hydrogen gas as a fuel gas (reactant gas), while the other electrode (cathode) is supplied with an oxidation gas (reactant gas), such as air or an oxidant, so that these two types of reactant gases undergo an electrochemical reaction in the MEA 1 to produce an electromotive force for the single cell.

The channel forming body 10 shown in FIG. 1B is disposed between the membrane electrode assembly and the separator 3 in the single cell, and has a structure integral with gas channels 120 and water conduits 110 formed on the front side and the rear side. FIG. 1B shows the channel forming body 10 as seen from the side of the membrane electrode assembly (i.e., from the side of the gas diffusion layer). In a case where the channel forming body 10 is used as a constituent member of the single cell, the gas diffusion layer 2 is disposed on the upper side (front side) of the channel forming body 10 in FIG. 1B, and the separator 3 is disposed on the lower side (rear side) of the channel forming body 10 in FIG. 1B. In FIG. 1B, an arrow W indicates a channel extension direction W.

The plurality of gas channels 120 are groove-like channels which are provided between a plurality of ridges 11 arrayed on the side of the channel forming body 10 (gas channel forming surface 10a) facing the membrane electrode assembly, and through which a gas is supplied to the fuel cell.

The water conduits 110 are channels which are provided on the side (rear side in FIG. 1B) opposite from the gas channel forming surface 10a, i.e., on the side of the channel forming body 10 facing the separator, and through which water produced from the fuel cell is discharged. The plurality of water conduits 110 are arrayed on the opposite side from the gas channels 120 across partition walls forming the ridges 11.

As shown in FIG. 1B, the channel forming body 10 has communication paths 130 that provide communication between the gas channel 120 and the water conduit 110. The plurality of communication paths 130 are formed in the partition walls forming the ridges 11, at predetermined intervals in the channel extension direction W, and water can flow between the gas channel 120 and the water conduit 110 through the communication path 130. Water produced by an electrode reaction in the membrane electrode assembly is discharged by flowing from the gas channel 120 to the water conduit 110 (i.e., toward the separator) through the communication path 130.

Figures 2A, 2B:
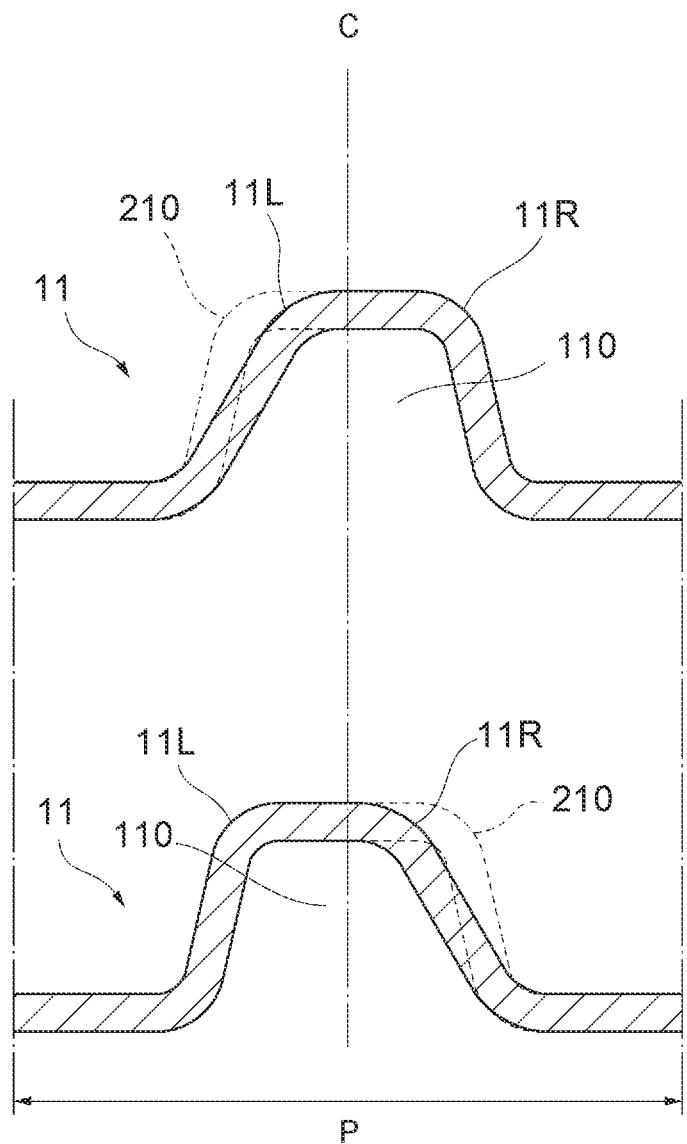
FIG. 2A is a sectional view taken along the line IIA-IIA indicated in FIG. 1.
FIG. 2B is a sectional view taken along the line IIB-IIB indicated in FIG. 1.

The shape of the ridge 11 of the channel forming body 10 will be further described. FIGS. 2A and 2B are sectional views of the ridge when the channel forming body 10 shown in FIG. 1B is cut in a direction perpendicular to the channel extension direction W. FIG. 2A is a sectional view taken along the line IIA-IIA of FIG. 1B. FIG. 2B is a sectional view taken along the line IIB-IIB of FIG. 1B.

As shown in FIGS. 2A and 2B, when the ridge 11 is seen in a cross-section perpendicular to the channel extension direction W, the ridge 11 has a shape in which a portion of one of both ends (11L, 11R) of the ridge across a central axis C of the ridge is trimmed, and trimmed portions are formed opposite from each other on the left and right sides with the communication path 130 interposed therebetween. Specifically, when the ridge 11 is seen in a cross-section perpendicular to the channel extension direction W, one of both ends (11L, 11R) of the ridge is shaped so as to be located closer to the center of the ridge (central axis C of the ridge) than an imaginary surface (indicated by the dashed line in FIGS. 2A and 2B; hereinafter referred to as an imaginary surface 210) of the channel assumed to extend in a straight line along the channel extension direction W. Moreover, when the ridge 11 is seen in the channel extension direction W, portions of both ends (11L, 11R) of the ridge located closer to the center of the ridge are formed opposite from each other at left and right ends of the external shape of the ridge 11 with the communication path 130 interposed therebetween. In FIG. 2A, the left end 11L of the ridge 11 is trimmed, i.e., the left end 11L is shaped so as to be located closer to the center of the ridge than the imaginary surface 210. In FIG. 2B, the right end 11R of the ridge 11 is trimmed, i.e., the right end 11R is shaped so as to be located closer to the center of the ridge than the imaginary surface 210.

FIGS. 2A and 2B etc. show an example in which the amount of trimming of the left end 11L of the ridge 11 (the amount of offset of the left end 11L toward the center) and the amount of trimming of the right end 11R of the ridge 11 (the amount of offset of the right end 11R toward the center) are equal, i.e., the shapes are bilaterally symmetrical. However, the shape of the ridge 11 is not limited to this example. In the present disclosure, therefore, the description "portions of both ends of the ridge located closer to the center of the ridge are formed opposite from each other at the left and right ends of the external shape of the ridge with the communication path interposed therebetween" does not limit the shape of the ridge to that shown in the drawings, and includes other shapes in which the amounts of offset on the left and right sides (the amount of offset of the left end 11L toward the center and the amount of offset of the right end 11R toward the center) are different from each other, i.e., bilaterally asymmetrical shapes.

Figure 6:
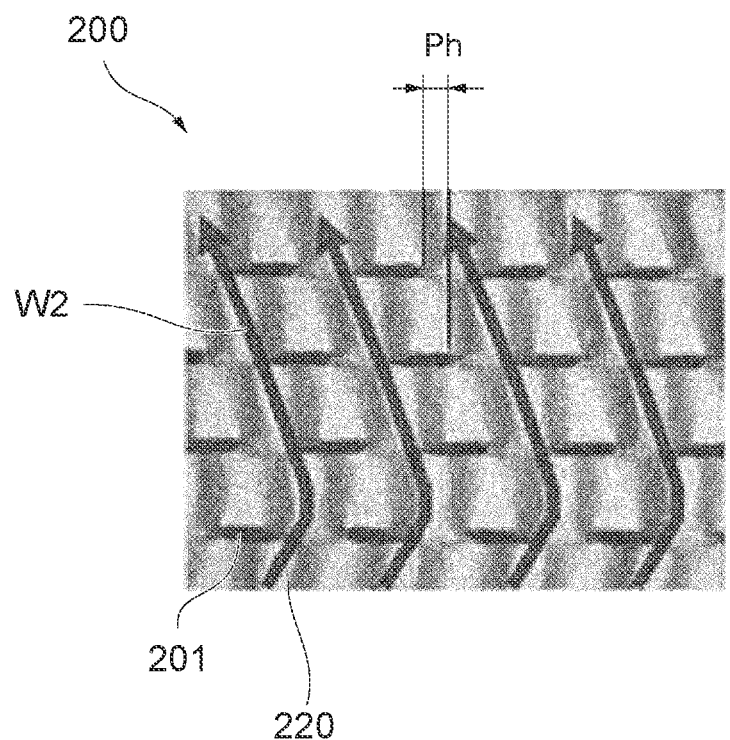
FIG. 6 is a schematic plan view showing a configuration of a conventional channel forming body.

In this embodiment, as shown in FIGS. 2A and 2B, the shape of one of both ends (11L, 11R) of the ridge is changed while a pitch P of the ridges 11 in the channel forming body 10 is kept constant in the channel extension direction W (i.e., the phase pitch of the ridges 11 is not varied). For example, as shown in FIG. 6, in a channel forming body 200 in which ridges 201 are provided at a varying phase pitch Ph, a gas flows so as to meander (wave) (gas flow direction W2 in FIG. 6), which results in a larger pressure loss. In this embodiment, by contrast, the pitch P of the ridges 11 in the channel forming body 10 is constant as shown in FIG. 1B and FIGS. 2A, and 2B. Thus, the risk of breakage during molding is reduced and the productivity is improved. Moreover, it is possible to suppress an increase in pressure loss while causing disturbance in the gas flow (arrows Wb in FIG. 1B).

Next, the shapes of adjacent ridges 11 will be further described. It is possible to adjust the amount of gas to be supplied by changing the shapes of adjacent ridges 11 according to the position in the surface of the channel forming body 10. Such examples will be described with reference to FIGS. 3A to 3C and FIGS. 4A to 4C.

Figure 3A:
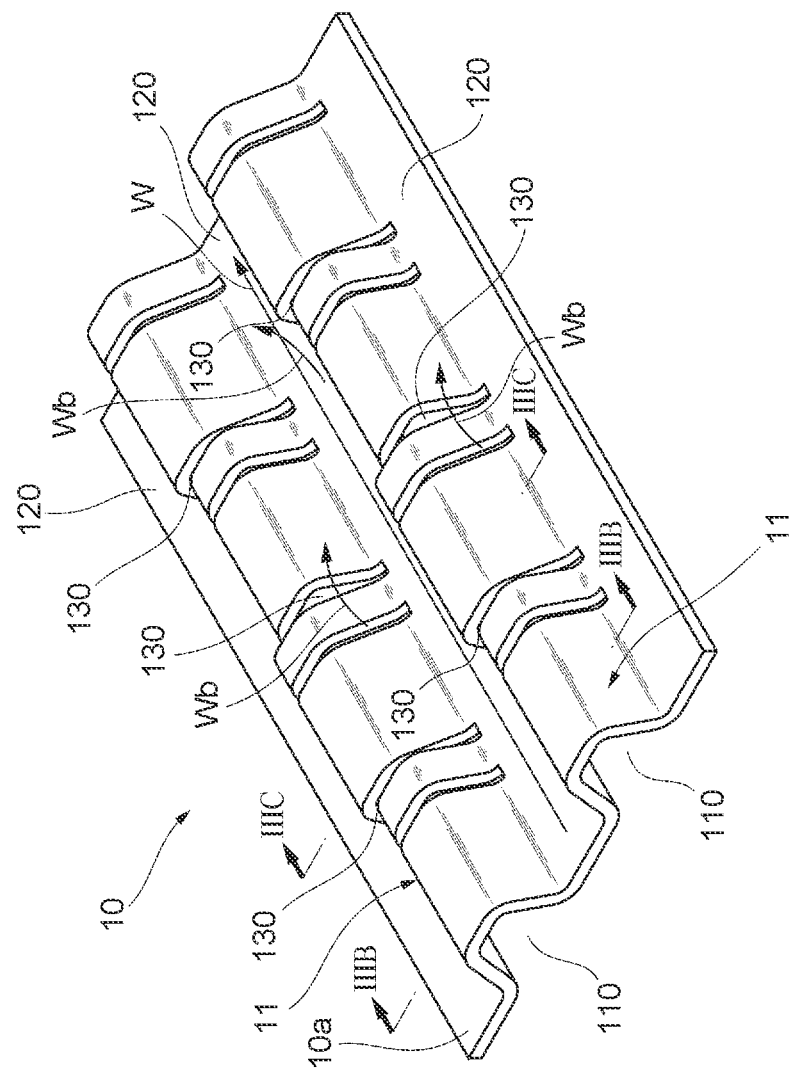
FIG. 3A is a view illustrating a channel forming body in which adjacent ridges have the same shape.

FIGS. 3A to 3C are views illustrating a channel forming body 10 in which adjacent ridges 11 have the same shape. Description of the same parts as in the embodiment described with reference to FIG. 1B and FIGS. 2A and 2B will be omitted.

As shown in FIGS. 3A to 3C, when the adjacent ridges 11 are seen in a cross-section perpendicular to the channel extension direction W, the portion of one ridge shaped so as to be located closer to the center of the ridge than the imaginary surface 210 is formed at the same end of both ends (11L, 11R) of the ridge as that of the other ridge. Specifically, in FIG. 3B, the left ends 11L of the adjacent ridges 11 are trimmed, i.e., the left ends 11L of the adjacent ridges 11 are shaped so as to be located closer to the center of the ridge than the imaginary surface 210. In FIG. 3C, the right ends 11R of the adjacent ridges 11 are trimmed, i.e., the right ends 11R of the adjacent ridges 11 are shaped so as to be located closer to the center of the ridge than the imaginary surface 210. In other words, when seen in a cross-section perpendicular to the channel extension direction W, the ridge 11 on the left side of an axis C2 passing through the midpoint between the adjacent ridges 11 and the ridge 11 on the right side of the axis C2 have the same shape.

If the adjacent ridges 11 have the same shape as shown in FIGS. 3A to 3C, the gas flow can be disturbed alternately toward the left and right sides (arrows Wb in FIG. 3A) when the gas channels 120 are seen in the channel extension direction W, and thereby the amount of gas supplied to the electrode is adjusted.

First Modified Example

Figure 4A:
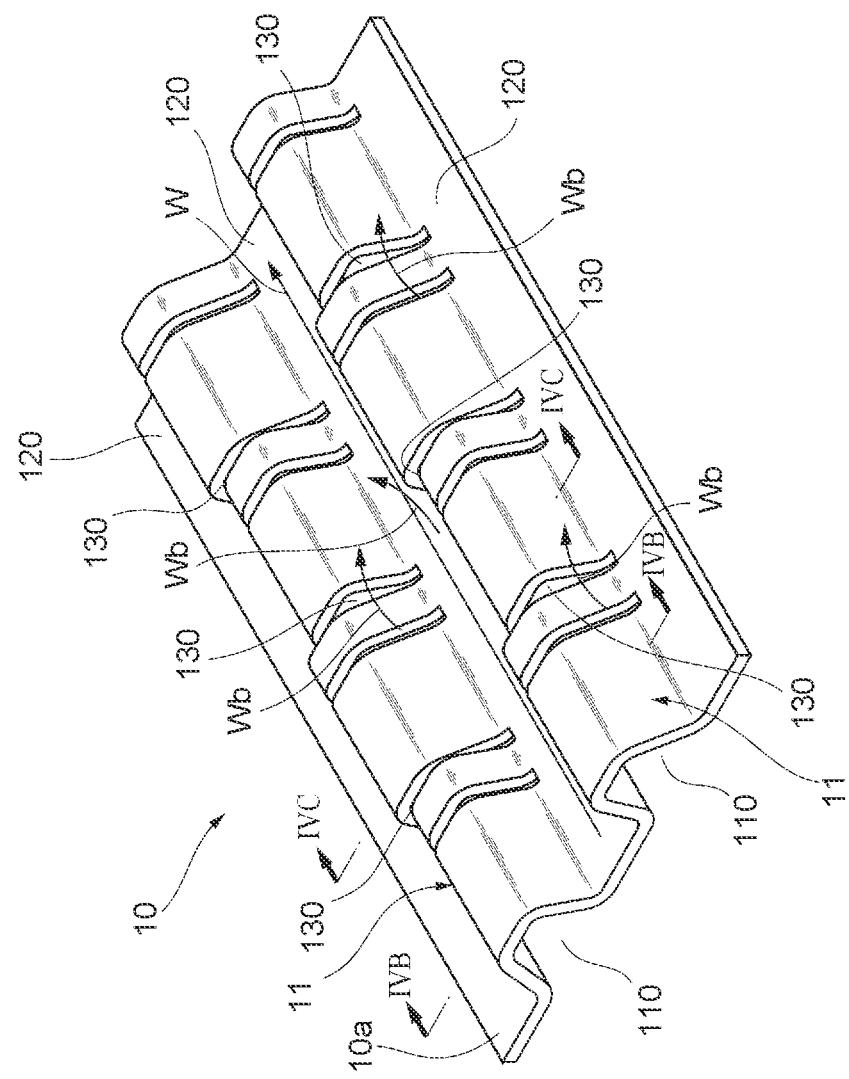
FIG. 4A is a view illustrating a channel forming body in which adjacent ridges are line-symmetrical.

Next, a first modified example in which the shapes of adjacent ridges 11 are changed will be described. FIGS. 4A to 4C are views illustrating a channel forming body 10 in which the shapes of the adjacent ridges 11 are line-symmetrical with respect to the axis C2. FIG. 4B is a sectional view taken along the line IVB-IVB of FIG. 4A, and FIG. 4C is a sectional view taken along the line IVC-IVC of FIG. 4A.

As shown in FIGS. 4A to 4C, when the ridges 11 are seen in a cross-section perpendicular to the channel extension direction W, the adjacent ridges 11 are trimmed at line-symmetrical positions with respect to the axis C2. In other words, the portions of both ends (11L, 11R) of the ridges shaped so as to be located closer to the center of the ridge than the imaginary surface 210 are line-symmetrical with respect to the axis C2. Specifically, in FIG. 4B, the left end 11L of the ridge 11 on the left side of the axis C2 is shaped so as to be located closer to the center of the ridge than the imaginary surface 210, and the right end 11R of the ridge 11 on the right side of the axis C2 is shaped so as to be located closer to the center of the ridge than the imaginary surface 210. In FIG. 4C, the right end 11R of the ridge 11 on the left side of the axis C2 is shaped so as to be located closer to the center of the ridge than the imaginary surface 210, and the left end 11L of the ridge 11 on the right side of the axis C2 is shaped so as to be located closer to the center of the ridge than the imaginary surface 210.

Thus, if the shapes of the adjacent ridges 11 are line-symmetrical with respect to the axis C2, the gas flow can be disturbed (arrows Wb in FIG. 4A) at positions corresponding to the communication paths 130 in the gas channels 120 (positions where the communication paths 130 are formed in the ridges 11) when the gas channels 120 are seen in the channel extension direction W, and thereby the amount of gas supplied to the electrode is adjusted.

Second Modified Example

Next, a second modified example in which the shapes of adjacent ridges 11 are changed will be described. It is possible to adjust the amount of gas to be supplied by changing the dimension of the portions shaped so as to be located closer to the center of the ridge than the imaginary surface 210 according to the position in the surface of the channel forming body 10. This example will be described with reference to FIGS. 5A and 5B.

Figure 5A:
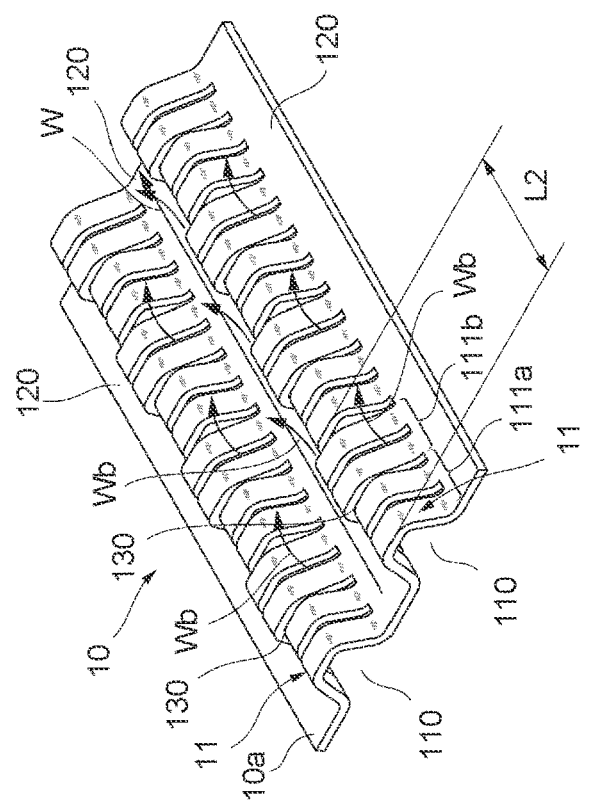
FIG. 5A is a view illustrating a channel forming body on an inlet side of a gas channel.
Figure 5B:
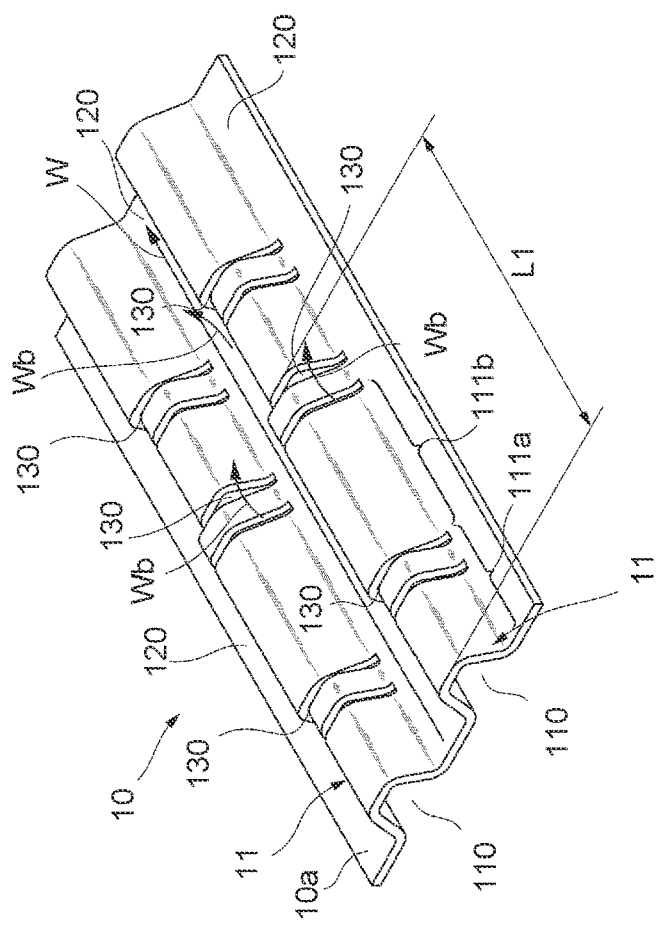
FIG. 5B is a view illustrating the channel forming body on an outlet side of the gas channel.

FIG. 5A is a view showing a modified example of the channel forming body on an inlet side of the gas channel, and FIG. 5B is a view showing a modified example of the channel forming body on an outlet side of the gas channel.

As shown in FIG. 5A, a dimension L1 on the inlet side of the gas channel 120 that is the dimension in the channel extension direction W of two ridge segments 111a, 111b (adjacent ridge segments) of which the respective portions located closer to the center of the ridge than the imaginary surface 210 (see FIGS. 2A and 2B) are formed opposite from each other at the left and right ends of the external shape of the ridge 11 with the communication path 130 interposed therebetween is larger than the dimension in the channel extension direction of two ridge segments (not shown) on a center side of the gas channel 120. The ridge segment 111a shown in FIG. 5A is a portion of the ridge 11 in which the left end 11L (see FIG. 2A) is shaped so as to be located closer to the center of the ridge than the imaginary surface 210, and the ridge segment 111b shown in FIG. 5A is a portion of the ridge 11 in which the right end 11R (see FIG. 2B) is shaped so as to be located closer to the center of the ridge than the imaginary surface 210. As an oxygen concentration is higher on the inlet side of the gas channel 120, increasing the dimension L1 on the inlet side can suppress the disturbance in the gas flow (arrows Wb) occurring at the positions where the shape of the ridge is bilaterally inverted, i.e., positions where the communication paths 130 are formed in the ridge 11. Thus, an increase in pressure loss can be suppressed.

On the other hand, as shown in FIG. 5B, a dimension L2 on the outlet side of the gas channel 120 that is the dimension in the channel extension direction W of the two ridge segments 111a, 111b (adjacent ridge segments) of which the respective portions located closer to the center of the ridge than the imaginary surface 210 (see FIGS. 2A and 2B) are formed opposite from each other at the left and right ends of the external shape of the ridge 11 with the communication path 130 interposed therebetween is smaller than the dimension in the channel extension direction of two ridge segments (not shown) on the center side of the gas channel 120. The ridge segment 111a shown in FIG. 5B is a portion of the ridge 11 in which the left end 11L (see FIG. 2A) is shaped so as to be located closer to the center of the ridge than the imaginary surface 210, and the ridge segment 111b shown in FIG. 5B is a portion of the ridge 11 in which the right end 11R (see FIG. 2B) is shaped so as to be located closer to the center of the ridge than the imaginary surface 210. As the oxygen concentration is lower on the outlet side of the gas channel 120, reducing the dimension L2 on the outlet side as shown in FIG. 5B can increase the degree of disturbance in the gas flow (arrows Wb) occurring at the positions where the shape of the ridge is bilaterally inverted, i.e., positions where the communication paths 130 are formed in the ridge 11. Thus, the amount of gas supplied to the electrode can be increased.

Alternatively, the forms shown in FIG. 3A to FIG. 5B having been described above may be provided in only a part of one channel forming body 10 (e.g., only the modified example shown in FIGS. 5A and 5B), or, for example, the form shown in FIGS. 3A to 3C or FIGS. 4A to 4C may be provided over the entire channel forming body 10. Moreover, a combination of these forms may be provided in one channel forming body 10. Thus, it is also possible to apply the form shown in FIGS. 5A and 5B (example of the dimension L1 and the dimension L2) on the inlet side and the outlet side of the gas channel 120; use the form shown in FIGS. 3A to 3C (example in which the adjacent ridges have the same shape) in a part of the channel forming body 10; and use the form shown in FIGS. 4A to 4C (example in which the adjacent ridges have line-symmetrical shapes) in another part of the channel forming body 10.

The embodiment of the present disclosure has been described above with reference to the specific examples. However, the present disclosure is not limited to these specific examples. Persons skilled in the art can make appropriate design changes to these specific examples, and such modified examples having any of the features of the present disclosure will also be included in the scope of the disclosure. The components and the arrangement, materials, conditions, shapes, sizes, etc. thereof included in the specific examples are not limited to those illustrated but can be changed appropriately.

What is claimed is:

1. A fuel cell module comprising:
   a membrane electrode assembly;
   a separator; and
   a channel forming body disposed between the membrane electrode assembly and the separator, wherein
   the channel forming body has:
     a gas channel which is provided between a plurality of ridges arrayed on a side of the channel forming body facing the membrane electrode assembly, and through which a gas is supplied to a fuel cell, wherein the plurality of ridges have the same height;
     a water conduit which is provided adjacent to the gas channel on a side of the channel forming body facing the separator, and through which water produced from the fuel cell is discharged; and
     communication paths that are formed in a partition wall forming each ridge and which provide communication between the gas channel and the water conduit,
   wherein each ridge has a central axis extending in the channel extension direction and comprises a plurality of ridge segments arranged in the channel extension direction and separated by communication paths;
   when the ridge is seen in a cross-section perpendicular to a channel extension direction, one of left and right upper ends of an external shape of the ridge is shaped so as to be located closer to the central axis of the ridge with respect to another of the left and right upper ends, and
   when the ridge is seen in the channel extension direction, portions of the ridge located closer to the center of the ridge in respective ridge segments are formed opposite from each other at left and right upper ends of the external shape of the ridge with the communication paths interposed therebetween and configured such that a gas flow through the gas channel is disturbed in a left-right direction of the left and right upper ends by portions of the ridge located not closer to the center of the ridge at positions where the communication paths are formed in the ridge.

2. The fuel cell module according to claim 1, wherein a dimension in the channel extension direction of a pair of ridge segments of which the respective portions located closer to the center of the ridge are formed opposite from each other at the left and right ends of the external shape of the ridge with the communication path interposed therebetween is larger on an inlet side of the gas channel than on a center side of the gas channel in the channel extension direction.

3. The fuel cell module according to claim 1, wherein a dimension in the channel extension direction of a pair of ridge segments of which the respective portions located closer to the center of the ridge are formed opposite from each other at the left and right ends of the external shape of the ridge with the communication path interposed therebetween is smaller on an outlet side of the gas channel than on a center side of the gas channel in the channel extension direction.

4. The fuel cell module according to claim 1, wherein, when adjacent ones of the ridges are seen in a cross-section perpendicular to the channel extension direction, the portion of one ridge shaped so as to be located closer to the center of the ridge than an imaginary surface formed at the same end of the left and right ends of the ridge as that of the ridge adjacent to the one ridge.

5. The fuel cell module according to claim 1, wherein, when adjacent ones of the ridges are seen in a cross-section perpendicular to the channel extension direction, the portion of one ridge shaped so as to be located closer to the center of the ridge than an imaginary surface formed at an end of the left and right ends of the ridge opposite from that of the ridge adjacent to the one ridge.

* * * * *